United States Patent [19]

Gordon

[11] 4,181,168
[45] Jan. 1, 1980

[54] PNEUMATIC TIRE

[75] Inventor: Robert E. Gordon, Toronto, Canada

[73] Assignee: Goodyear Canada, Inc., Toronto, Canada

[21] Appl. No.: 668,890

[22] Filed: Mar. 22, 1976

Related U.S. Application Data

[60] Continuation of Ser. No. 308,912, Nov. 22, 1972, abandoned, which is a division of Ser. No. 84,672, Oct. 28, 1970, abandoned.

[51] Int. Cl.² ............................................. B60C 15/06
[52] U.S. Cl. .......................... 152/362 CS; 152/330 R
[58] Field of Search ................ 156/128; 152/330, 354, 152/356, 357, 359, 361 R, 361 DM, 361 FP, 362 CS, 362 R, 357 A

[56] References Cited

U.S. PATENT DOCUMENTS

| 2,698,042 | 12/1954 | Perkins | 152/362 R |
|---|---|---|---|
| 2,979,111 | 4/1961 | Schutz | 152/362 R |
| 3,013,599 | 12/1961 | Riggs | 152/362 R |
| 3,414,446 | 12/1968 | Pearce et al. | 156/128 |
| 3,638,705 | 2/1972 | Devienne | 152/362 R |

FOREIGN PATENT DOCUMENTS

| 1480936 | 3/1969 | Fed. Rep. of Germany | 152/361 R |
|---|---|---|---|
| 736231 | 9/1932 | France | 152/354 |
| 11554 | of 1914 | United Kingdom | 152/330 |

*Primary Examiner*—Robert W. Saifer
*Attorney, Agent, or Firm*—Frank Pincelli

[57] ABSTRACT

A cordless pneumatic tire built on a conventional tire building drum by placing an extruded piece of uncured rubber, including tread and sidewall compounds, between a pair of beads positioned on a pair of rubberized strips, with reinforcing cords, disposed in parallel relation around the building drum. The ends of the strips extending beyond the beads, are reversely turned back over the beads into contacting, adhering relation with the sidewall stock, forming an uncured tire body, which is then removed from the building drum, placed in a mold and heated to vulcanize the tire.

8 Claims, 7 Drawing Figures

PNEUMATIC TIRE

This application is a continuation of application Ser. No. 308,912, Nov. 22, 1972, now abandoned, which is a division of application Ser. No. 84,672, Oct. 28, 1970, now abandoned. U.S. Pat. No. 3,919,024 issued from application Ser. No. 308,913, which is a continuation of application Ser. No. 84,672.

BACKGROUND OF THE INVENTION

Cordless pneumatic tires built in accordance with the invention, are particularly well suited for use on lightweight amphibious type vehicles employing flotation tires. Such vehicles are generally not equipped for traveling at high speeds and, consequently, strips of tread, or composite strips of tread and sidewall material, without reinforcing cords, can be utilized for forming the tire.

Some flotation tires presently used, are integrally formed and cured on specially designed wheel rims, and do not employ beads. Moreover, distinct and sometimes unusual tire building methods must be employed for building and vulcanizing such tires. The invention is directed to utilizing existing equipment and conventional flat-band tire building techniques, i.e. successively wrapping or layering pieces of tire building material around a cylindrical tire building drum, for producing a cordless tire suitable for mounting on conventional wheel rims.

Briefly stated, the invention is in a cordless pneumatic tire and tire building method. The molded and cured tire comprises a pair of beads and trap strips that partially wrap around the beads and trap the beads against the sidewalls of an extruded piece of tread and sidewall material. Trap strips are strips of material including cords, filaments, or laminates composed of cotton, rayon, polyester, plastic, glass, rubber, metal or any other suitable reinforcing material.

The method of building the tire includes the steps of placing the following material around a cylindrical tire building drum: (1) a pair of trap strips in predetermined parallel relation; (2) a pair of beads on the trap strips intermediate the lateral edges of the strips; and (3) an extruded piece of uncured material, including the tread and sidewalls, between the beads in contacting relation with the portions of the trap strips between or inside the beads. The portions of the trap strips outside the beads are reversely folded back over the beads into bead-tying engagement with adjacent exposed faces of the sidewalls. The generally cylindrical uncured tire body is then removed from the building drum, placed in a mold and cured. A gas impervious innerliner, if desired, is first positioned on the drum, after which the trap strips are placed in parallel, completely overlapping relation around the innerliner adjacent the lateral edges thereof.

DESCRIPTION OF THE DRAWING

The following description of the invention will be better understood by having reference to the annexed drawing, wherein.

DESCRIPTION OF THE INVENTION

Figure 1:
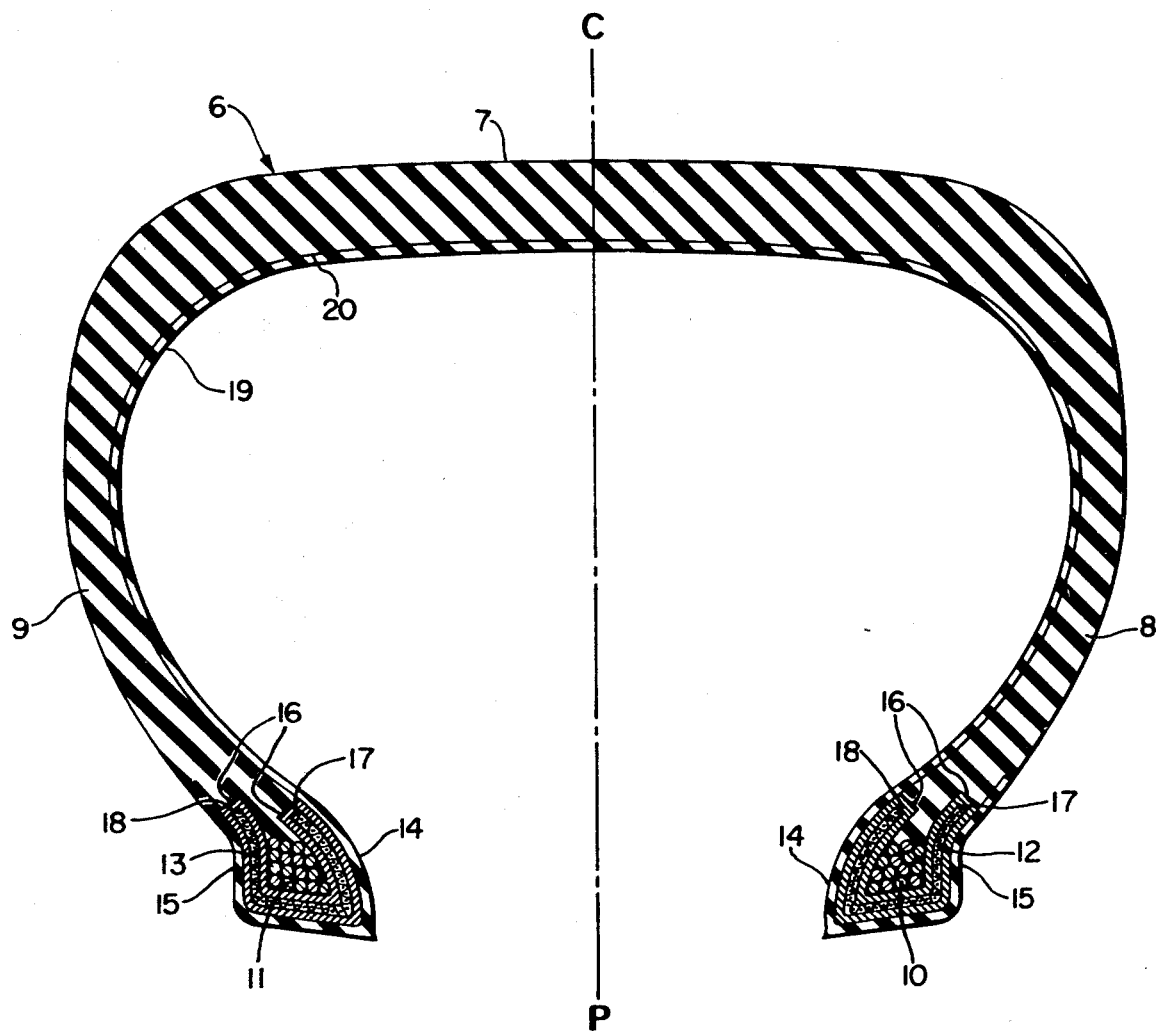
FIG. 1 is a cross-section of a cordless pneumatic tire made in accordance with the invention.

Referring more particularly to FIG. 1, there is shown a molded and cured cordless pneumatic tire, generally indicated at 6, having a conventional toroidal configuration. The tire 6 comprises a tread 7 and a pair of sidewalls 8 and 9 extending from the tread 7 and interlockingly engaging a pair of annular beads 10 and 11, which are preferably composed of metal, e.g. uncoated, or zinc or brass-coated steel wire. The tire 6 is symmetrical about a plane passing through the mid-circumferential centerline of the tread 7, such plane being referred to as the centerplane (CP). Conventional textile cords extending from bead to bead, are not employed for reinforcing the tread 7 and sidewalls 8 and 9 of the tire 6.

The tread and sidewalls, prior to molding, are formed from an uncured piece of elastomeric material, e.g. natural or synthetic rubber. The piece of rubber can be extruded from any suitable tread compound, or composite tread and sidewall compounds which are compatible. It is desirable that the rubber compound or compounds, whichever the case, have a high curing rate to keep molding costs at a minimum. Moreover, the compound, when cured, should be sufficiently strong, such that the tires can be produced with minimum gauges adequate to support vehicles in operation and contain air pressures required for setting the beads on the wheel rims.

A pair of trap strips 12 and 13 partially surround the beads 10 and 11 and extend into the tire body adjacent inner and outer faces 14 and 15 of the sidewalls 8 and 9. The trap strips 12 and 13 are provided for trapping or securing the beads 10 and 11 to the adjacent sidewalls 8 and 9. The trap strips 12 and 13 are composed of any suitable material, as previously described, and are preferably coated with any appropriate elastomeric material, e.g. any gum rubber 16 compatible with the other material of the tire 6. The gum rubber 16 extends beyond the lateral edges 17 and 18 of each of the trap strings 12 and 13 and produces a highly improved tie-in of the trap strips. The extensions of the gum rubber 16 also acts to prevent separation of the trap strips 12 and 13 from the sidewalls 8 and 9. The trap strips 12 and 13 overlap the sidewalls 8 and 9 a distance sufficient to provide a good interlock between the strips and sidewalls.

A separate gas impervious innerliner 19 is preferably used to seal the inner walls 20 of the tire 6, and can be formed of any suitable elastomeric material, e.g. any rubber compound compatible with the other materials used to form the tire. The innerliner 19 may be incorporated with the trap strips 12 and 13 to form a composite innerliner with trap strips adjacent its lateral edges.

BUILDING THE CORDLESS TIRE

Figure 2:
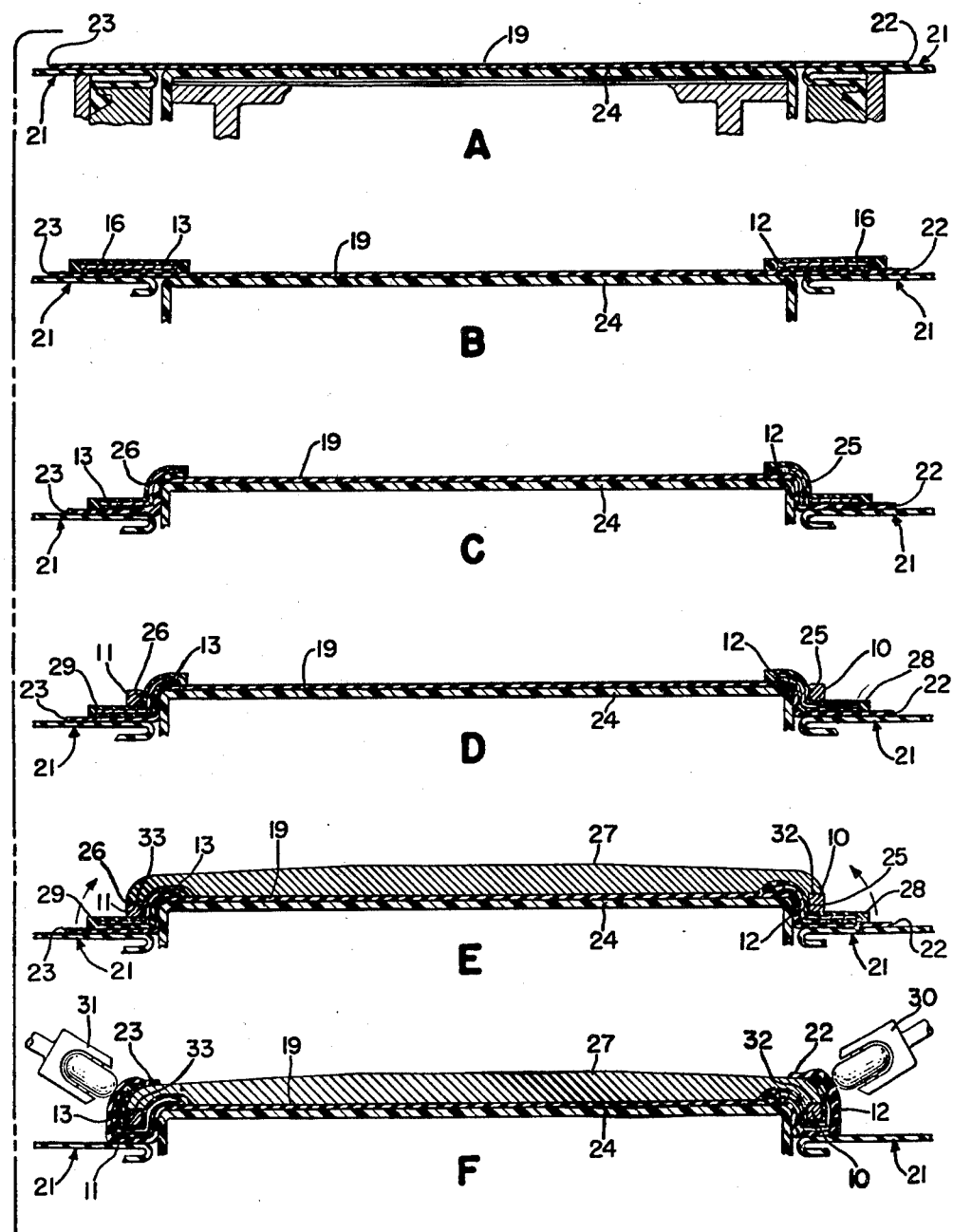
FIGS. 2A–2F are schematic illustrations of the building of a cordless pneumatic tire body suitable for molding and vulcanizing.

Referring more particularly to FIGS. 2A–2F, there is shown a conventionally designed expansible building drum 21 on which flat-band building methods are employed for constructing the tire 6. In the embodiment shown, an innerliner 19 is first wrapped in cylindrical relation around the building drum 21 (FIG. 2A). The trap strips 12 and 13, including coatings of gum rubber 16, are then positioned in at least partially, and preferably completely, overlapping relation around the innerliner 19 adjacent its opposing lateral edges 22 and 23 (FIG. 2B).

An intermediate portion 24 of the building drum 21, is expanded to form a pair of shoulders 25 and 26 in the trap strips 12 and 13 for seating engagement against a pair of wire beads 10 and 11 moved into position around the building drum 21 (FIGS. 2C-2D).

An extruded piece 27 of uncured tread compound, or tread and sidewall compound, is placed in surrounding relation against the innerliner 19 and trap strips 12 and 13 intermediate the wire beads 10 and 11 (FIG. 2E). The portions 28 and 29 of the trap strips 12 and 13 outside the wire beads 10 and 11, and the lateral edges 22 and 23 of the innerliner 19, are reversely turned back over the beads and compressed in overlapping relation against the outer faces 15 of the sidewalls 8 and 9. A pair of rollers 30 and 31 are used to stitch down the trap strips 12 and 13 and lateral edges 22 and 23 of the innerliner 19 against the adjacent outer exposed faces 15 of the sidewalls 8 and 9. Thus, the adjacent edges 32 and 33 of the sidewalls 8 and 9 are trapped or sandwiched firmly between the trap strips 12 and 13.

The building drum 21 is then collapsed and the intermediate portion 24 returned to its unexpanded position, such that the uncured tire body can be removed from the building drum 21 for placing in a conventional mold, which is then heated to vulcanize the rubber material and form the finished tire 6.

Thus, there has been provided a new and novel cordless tire and tire building method. Conventional tire building techniques are used for producing the tire which, except for the trap strips securing the beads to the sidewalls, does not have conventional tire cords extending from bead to bead for reinforcing the tread and sidewalls of the tire.

While certain representative embodiments and details have been shown for the purpose of illustrating the invention, it will be apparent to those skilled in the art that various changes and modifications may be made therein without departing from the spirit or scope of the invention.

I claim:
1. A pneumatic tire, consisting of:
    (a) a pair of spaced, annular beads;
    (b) a tread and pair of sidewalls integrally extruded free of reinforcement cords and toroidally shaped between the beads; and
    (c) a trap strip wrapped around each of the beads and engaging the sidewalls, the trap strips including reinforcements for holding the beads to the sidewalls.
2. The tire of claim 1, wherein the trap strips include laminates composed of material selected from the group consisting of plastic, glass, rubber, and metal.
3. The tire of claim 1, wherein the trap strips include filaments composed of material selected from the group consisting of cotton, rayon, nylon, polyester, glass fibers, and metal.
4. The tire of claim 1, wherein the trap strips include a plurality of tire cords composed of material selected from the group consisting of cotton, rayon, nylon, polyester, glass fibers, and metal.
5. The tire of claim 1, which includes a gas impervious innerliner disposed within and vulcanized with the tread and sidewalls, the innerliner being formed separately from the extruded tread and sidewalls.
6. The tire of claim 5, wherein the trap strips include tire cords composed of material selected from the group consisting of cotton, rayon, nylon, polyester, glass fibers, and metal.
7. The tire of claim 5, wherein the unvulcanized rubber material forming the tread, sidewalls, and any carcass plies, is sandwiched between free ends of the trap strips, prior to culcanization of the tire.
8. The tire of claim 7, wherein the beads are composed of metal.

* * * * *

UNITED STATES PATENT AND TRADEMARK OFFICE
CERTIFICATE OF CORRECTION

PATENT NO. : 4,181,168
DATED : January 1, 1980
INVENTOR(S) : Robert E. Gordon

It is certified that error appears in the above-identified patent and that said Letters Patent are hereby corrected as shown below:

column 2, line 40: "strings" should be -- strips -- .

Signed and Sealed this

Thirteenth Day of October 1981

[SEAL]

Attest:

GERALD J. MOSSINGHOFF

*Attesting Officer*     *Commissioner of Patents and Trademarks*